US012035177B2

(12) United States Patent
Otaka et al.

(10) Patent No.: US 12,035,177 B2
(45) Date of Patent: Jul. 9, 2024

(54) COMMUNICATION DEVICE, USER TERMINAL, COMMUNICATION SYSTEM, NOTIFICATION METHOD, AND PROGRAM FOR HANDOVER COMMUNICATIONS

(71) Applicant: Honda Motor Co., Ltd., Tokyo (JP)

(72) Inventors: Masaru Otaka, Wako (JP); Hideki Matsunaga, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 364 days.

(21) Appl. No.: 17/176,356

(22) Filed: Feb. 16, 2021

(65) Prior Publication Data
US 2021/0168664 A1 Jun. 3, 2021

Related U.S. Application Data
(63) Continuation of application No. PCT/JP2019/014315, filed on Mar. 29, 2019.

(51) Int. Cl.
*H04W 36/00* (2009.01)
*H04W 4/40* (2018.01)
*H04W 36/08* (2009.01)
*H04W 36/30* (2009.01)
*H04W 36/38* (2009.01)
*H04W 36/32* (2009.01)

(52) U.S. Cl.
CPC ......... *H04W 36/0005* (2013.01); *H04W 4/40* (2018.02); *H04W 36/0061* (2013.01); *H04W 36/08* (2013.01); *H04W 36/30* (2013.01); *H04W 36/38* (2013.01); *H04W 36/32* (2013.01)

(58) Field of Classification Search
CPC ......... H04W 36/0005; H04W 36/0061; H04W 36/08; H04W 36/30; H04W 36/38; H04W 36/32; H04W 36/0072; H04W 4/40; H04W 88/08; B60W 40/02; G08G 1/09
See application file for complete search history.

(56) References Cited

U.S. PATENT DOCUMENTS

| 2009/0201881 A1 | 8/2009 | Chun et al. |
| 2010/0061337 A1 | 3/2010 | Hallenstal et al. |
| 2011/0009121 A1 | 1/2011 | Yu et al. |

(Continued)

FOREIGN PATENT DOCUMENTS

| EP | 3223547 A | 9/2017 |
| JP | 2006333386 A | 12/2006 |

(Continued)

OTHER PUBLICATIONS

Notice of Reasons for Refusal from Japan Patent Office for Japanese Patent Application No. 2021-511760, dated Oct. 28, 2022.
European Search Report of EP application No. 19923328, dated Mar. 3, 2022.
Communication from the Examining Division of Related European Application EP19923328, dated Nov. 29, 2022.

(Continued)

*Primary Examiner* — Nam T Huynh
(74) *Attorney, Agent, or Firm* — Morgan Lincoln; American Honda Motor Co., Inc.

(57) ABSTRACT

A communication device, user terminal, communication system, notification method, and program for handover connections is provided. The communication device may specify a type of handover used to request a communication handover executed by a user terminal, and may notify a user terminal of information related to a specified interface handover type.

11 Claims, 7 Drawing Sheets

(56) References Cited

U.S. PATENT DOCUMENTS

| | | | | |
|---|---|---|---|---|
| 2012/0190368 A1* | 7/2012 | Zhang | ............... | H04B 7/15507 |
| | | | | 455/466 |
| 2016/0066240 A1 | 3/2016 | Suzuki | | |
| 2019/0049948 A1 | 2/2019 | Patel et al. | | |
| 2019/0212732 A1 | 7/2019 | Takanashi et al. | | |
| 2019/0223073 A1* | 7/2019 | Chen | ............... | H04W 36/365 |
| 2020/0169866 A1* | 5/2020 | Matsumoto | ......... | H04W 12/033 |

FOREIGN PATENT DOCUMENTS

| | | | |
|---|---|---|---|
| JP | 2013009170 A | 1/2013 | |
| JP | 2013110727 A | 6/2013 | |
| JP | 2014220694 A | 11/2014 | |
| JP | 2017216663 A1 | 12/2017 | |
| WO | WO2018037945 A1 | 3/2018 | |
| WO | WO2019032292 A1 | 2/2019 | |

OTHER PUBLICATIONS

International Search Report of related international application PCT/JP2019/014315, dated Jun. 4, 2019.

English Translation of International Search Report of related international application PCT/JP2019/014315, dated Jun. 4, 2019.

Written Opinion of the International Searching Authority of related international application PCT/JP2019/014315, dated Jun. 4, 2019.

Communication from the Examining Division of Related European Application EP19923328, dated Mar. 28, 2023.

The first review of the opinion of the notice from Chinese Patent Office for CN Patent Application No. 201980094533.1, dated Apr. 28, 2023.

Decision of Refusal from Japan Patent Office for Japanese Patent Application No. JP2021-0511760, dated Sep. 1, 2023.

* cited by examiner

COMMUNICATION DEVICE, USER TERMINAL, COMMUNICATION SYSTEM, NOTIFICATION METHOD, AND PROGRAM FOR HANDOVER COMMUNICATIONS

CROSS-REFERENCE TO RELATED DISCLOSURE

This application is a continuation of International Patent Application No. PCT/JP2019/014315 filed Mar. 29, 2019, which is hereby incorporated by reference in its entirety.

FIELD

The present disclosure is related to a communication device, user terminal, communication system, and program for handover connections.

BACKGROUND

An operator at a remote location may operate and move a vehicle using remote driving technology. One element with remote driving may be to suppress communication delay between an operator device operated by an operator performing remote driving and a user terminal provided in a vehicle.

SUMMARY

As a user terminal moves, handover occurs by switching the wireless base station to which the user terminal is connected. Delay time at the moment of handover differs based on the type of handover. If the user terminal knows the handover type, the user terminal may perform an operation based on the delay time. An object of the present disclosure is to provide technology for allowing a user terminal to perform a process based on the delay time.

In an embodiment, a communication device is provided that may: specify a type of handover executed by a user terminal; and notify the user terminal of information related to the specified handover type.

In an embodiment, a user terminal may perform a process based on the delay time.

In an embodiment, a communication device is provided that comprises a memory storing instructions when executed by a processor causes the processor to specify a type of handover to be executed by a user terminal, and notify the user terminal of information related to the specified handover type.

In an embodiment, a user terminal is provided that comprises a memory storing instructions when executed by a processor causes the processor to receive information related to a handover type from a communication device.

In an embodiment, a communication system is provided that comprises a communication device and a user terminal. The communication device comprises a memory storing instructions when executed by a processor causes the processor to specify a handover type to be executed by the user terminal, and notify the user terminal of information related to the specified handover type. The user terminal comprises a memory storing instructions when executed by a processor causes the processor to receive information related to the specified handover type from the communication device.

In an embodiment, a computer-implemented handover method executed by a user terminal is provided. The method comprises receiving information related to a handover type from a communication device, and executing a predetermined traveling condition control if the handover type is a predetermined type or if a communication delay for the handover type is greater than a threshold value. The method may also comprise notifying the communication device of a planned travel route of the user terminal, and determining a communication delay required for handover on the planned travel route based on the information related to the handover type received from the communication device. The information related to the handover type may comprise a source wireless base station and a target wireless base station along the planned travel route for the handover.

In an embodiment, a computer-implemented handover method executed by a communication device is provided. The method comprises specifying a type of handover executed by a user terminal, and notifying the user terminal of information related to the specified handover type. The method may also comprise receiving a planned travel route of the user terminal, and providing a handover instruction to the user terminal after notifying the user terminal of information related to the specified handover type. The information related to the specified handover type may comprise at least two wireless base stations having overlapping coverage on the planned travel route and an order in which the user terminal passes through the coverage of each. One of the at least two wireless base stations may be specified as a source wireless base station and another of the at least two wireless base stations may be specified as a target wireless base station.

Other features and advantages of the present disclosure will be apparent based on the following description with reference to the attached drawings. Note that in the attached drawings, the same or similar configurations are denoted by the same reference numerals.

BRIEF DESCRIPTION OF THE DRAWINGS

The attached drawings are included in the specification, configure a portion thereof, indicate embodiments of the present disclosure, and are used along with descriptions thereof to describe the principles of the present disclosure.

DESCRIPTION

Embodiments are described in detail below with reference to the attached drawings. Note that the following embodiments do not limit the disclosure according to the claims, and not all combinations of the features described in the embodiments are essential to the disclosure. Two or more of a plurality of features described in the embodiments may be arbitrarily combined.

A configuration example of a communication system according to some embodiments will be described while referring to FIG. 1. A communication system based on an EPC (Evolved Packet Core) used in a 4G network is described below as an example. The EPC may also be used as a core network for a 5G network in NSA (non-standalone) mode. Alternatively, the present disclosure may be applied to other communication standards such as 3G core networks, 5G cores, and the like. When applied to other communication standards, the names of network entities and messages described below are appropriately replaced.

The communication system includes a user terminal (UE: User Equipment) 110, a plurality of wireless base stations 120a, 120b, 120c, and 120d, a plurality of MMEs (Mobility Management Entity) 130a and 130b, a plurality of S-GWs (Serving Gateway) 140a and 140b, and a P-GW (Packet Data Network Gateway) 150. The MMEs 130a and 130b, S-GWs 140a and 140b, and P-GW 150 are included in a core network. Other network entities included in the core network may, for example, have an existing configuration, and therefore, a description is omitted. The plurality of wireless base stations 120a to 120d are collectively referred to as a wireless base station 120. A description of the wireless base station 120 below applies to the plurality of wireless base stations 120a to 120d. Similarly, the plurality of MMEs 130a to 130b are collectively referred to as an MME 130, and the plurality of S-GWs 140a to 140b are collectively referred to as an S-GW 140.

The user terminal 110 is a communication device that receives a communication service from a communication network, and may also be referred to as a terminal device. The user terminal 110 may be various types of communication devices such as vehicles, portable terminals, and monitoring cameras. A case where the user terminal 110 is a vehicle (specifically, a communication device incorporated in the vehicle or brought into the vehicle) is described below.

The wireless base station 120 is a communication device for providing a wireless connection with the user terminal 110. The wireless base station 120 may be referred to as an eNode B in a 4G network and a gNode B in a 5G network. The MME 130 is a network entity that authenticates the user terminal 110 or makes a request for setting a communication path to an opposing party. The S-GW 140 is a network entity that provides a user packet routing function. The P-GW 150 is a network entity that functions as a connection point with an external IP network.

Figure 1:
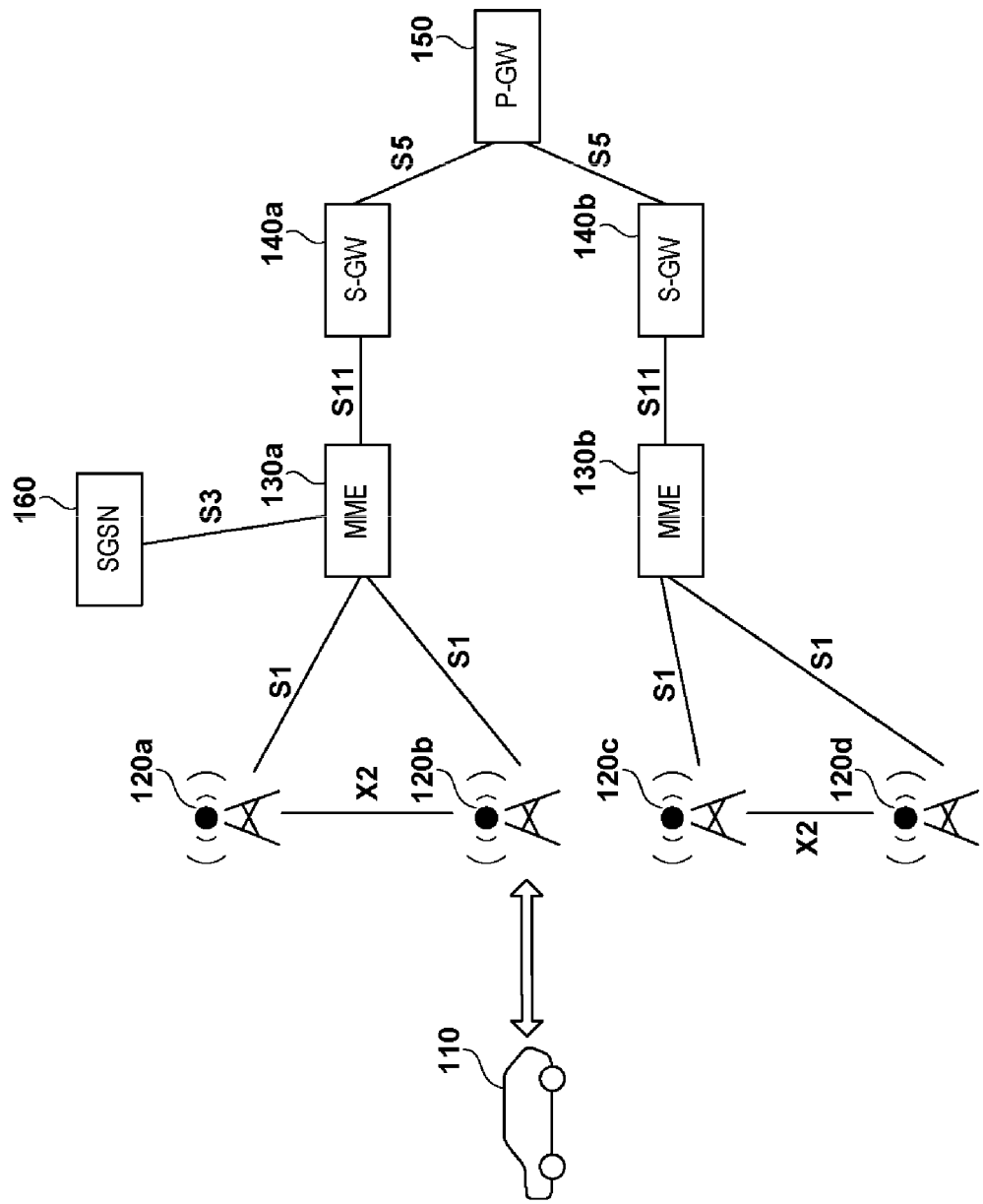
FIG. 1 is a block diagram describing an exemplary configuration of a communication system in accordance with one aspect of the present disclosure.

In a non-limiting example as shown in FIG. 1, the wireless base station 120a and wireless base station 120b are mutually connected by an X2 interface. The wireless base station 120c and wireless base station 120d are mutually connected by an X2 interface. The MME 130a and wireless base station 120a are mutually connected by an S1 interface. The MME 130a and wireless base station 120b are mutually connected by an S1 interface. The MME 130b and wireless base station 120c are mutually connected by an S1 interface. The MME 130b and wireless base station 120d are mutually connected by an S1 interface. The S-GW 140a and MME 130a are mutually connected by an S11 interface. The S-GW 140b and MME 130b are mutually connected by an S11 interface. The P-GW 150 and S-GW 140a are mutually connected by an S5 interface. The P-GW 150 and S-GW 140b are mutually connected by an S5 interface. The MME 130a is further connected to an SGSN (Serving GPRS Support Node) 160 serving as a network entity that transfers user traffic in a 3G network via an S3 interface.

Figure 2:
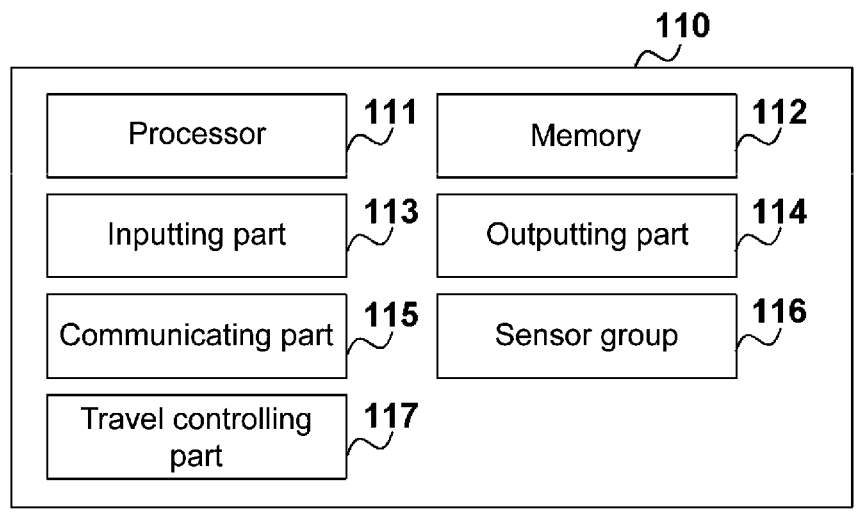
FIG. 2 is a block diagram describing an exemplary configuration of a vehicle in accordance with one aspect of the present disclosure.

A configuration example of the user terminal 110 is described while referring to FIG. 2. The user terminal 110 includes a processor 111, a memory 112, an inputting part 113, an outputting part 114, a communicating part 115, a sensor group 116, and a travel controlling part 117. If the user terminal 110 is not in a vehicle, the user terminal 110 includes a processor 111, a memory 112, a communicating part 115, and a component unique to each user terminal (for example, an image sensor for a monitoring camera, or the like). In FIG. 2, primarily components used in the description of the embodiment are described, and components unique to the user terminal 110 such as a steering wheel, brake, or the like are omitted.

The processor 111 controls operation of the entire user terminal 110. The processor 111 functions, for example, as a CPU. The memory 112 stores a program used for operation of the user terminal 110, temporary data, and the like. The memory 112 is achieved, for example, by a ROM, a RAM, or the like. Furthermore, the memory 112 may include a secondary storage such as a hard disk drive. The inputting part 113 is used by a user (for example, a driver or an occupant) of the user terminal 110 to input to the user terminal 110. The outputting part 114 is used to output information from the user terminal 110 to the user, and is achieved, for example, by a displaying device (display) or acoustic device (speaker). The communicating part 115 provides a function where the user terminal 110 communicates with another device such as the wireless base station 120, another vehicle, or the like, and is achieved, for example, by an antenna, baseband processor, or the like.

The sensor group 116 is one or more sensors for acquiring a condition of the user terminal 110, a condition of the driver, and peripheral information of the user terminal 110. The sensor group 116, for example, includes a camera for photographing outside of the vehicle, a LiDAR (Light Detection and Ranging) or millimeter-wave radar for detecting a target outside of the vehicle or measuring a distance to the target, and a GPS (Global Positioning System) for measuring a geographical position of the user terminal 110.

The travel controlling part 117 automatically controls at least one of steering or acceleration/deceleration of the user terminal 110. The travel controlling part 117 is configured, for example, from an ECU. The user terminal 110 may be in a remote driving condition, automatic driving condition, or manual driving condition.

The remote driving condition is a condition where the user terminal 110 travels based on a command from outside of the user terminal 110. For example, the travel controlling part 117 transmits information obtained by the sensor group 116 to a device of the operator located away from the user terminal 110 via the wireless base station 120 and core network. The operator generates a command for operating the user terminal 110 based on the information and then transmits the command to the user terminal 110. The travel controlling part 117 automatically controls at least one of steering or acceleration/deceleration of the user terminal 110 in accordance with the command.

The automatic driving condition is a condition where the user terminal 110 travels based on the information from the sensor group 116. For example, the travel controlling part 117 sets a path for the user terminal 110 based on the information obtained by the sensor group 116, and automatically controls at least one of steering and acceleration/deceleration of the user terminal 110 such that the user terminal 110 travels along the path. The manual driving condition is a condition where the driver of the user terminal 110 manually drives. During manual driving, driving assistance by the user terminal 110 may be performed.

Figure 3:
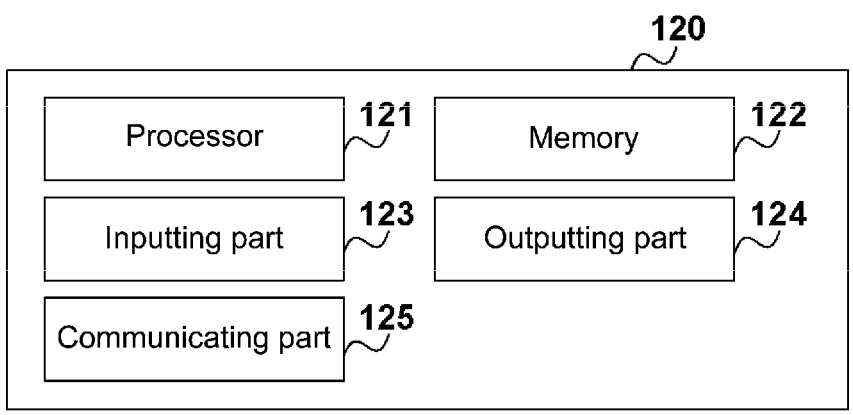
FIG. 3 is a block diagram describing an exemplary configuration of a wireless base station in accordance with one aspect of the present disclosure.

A configuration example of the wireless base station 120 is described while referring to FIG. 3. The wireless base station 120 includes a processor 121, a memory 122, an inputting part 123, an outputting part 124, and a communicating part 125.

The processor 121 controls an operation of the entire wireless base station 120. The processor 121 functions, for example, as a CPU. The memory 122 stores a program used for operation of the wireless base station 120, temporary data, and the like. The memory 122 is achieved, for example, by a ROM, a RAM, or the like. Furthermore, the memory 122 may include a secondary storage such as a hard disk drive. The inputting part 123 is used by the user of the wireless base station 120 to input to the wireless base station 120. The outputting part 124 is used to output information from the wireless base station 120 to the user, and is implemented, for example, by a displaying device (display) or acoustic device (speaker). The communicating part 125 provides a function where the wireless base station 120 communicates with another device such as user terminal 110, MME 130, or the like, and is implemented, for example, by an antenna, baseband processor, or the like.

Figure 4:
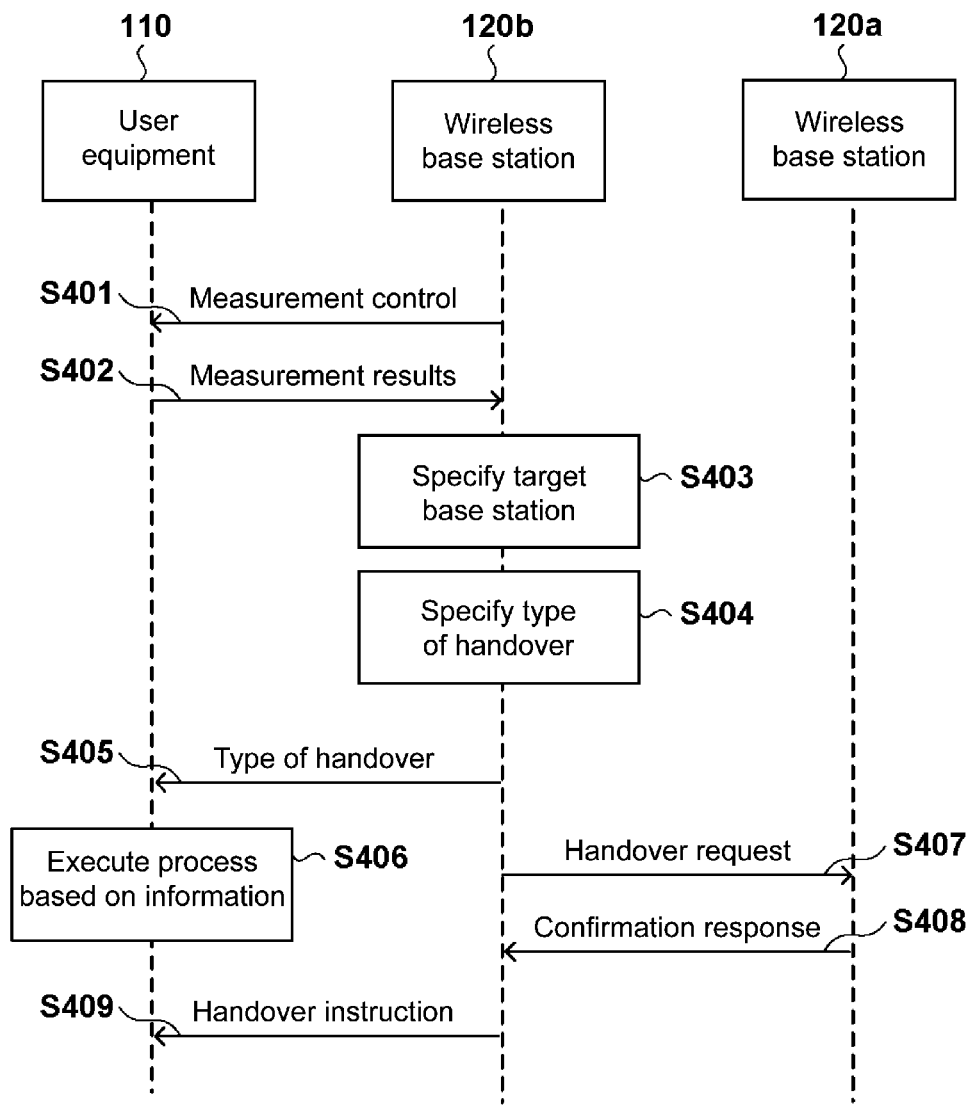
FIG. 4 is a sequence diagram describing an exemplary operation of a communication system in accordance with one aspect of the present disclosure.
Figure 5:
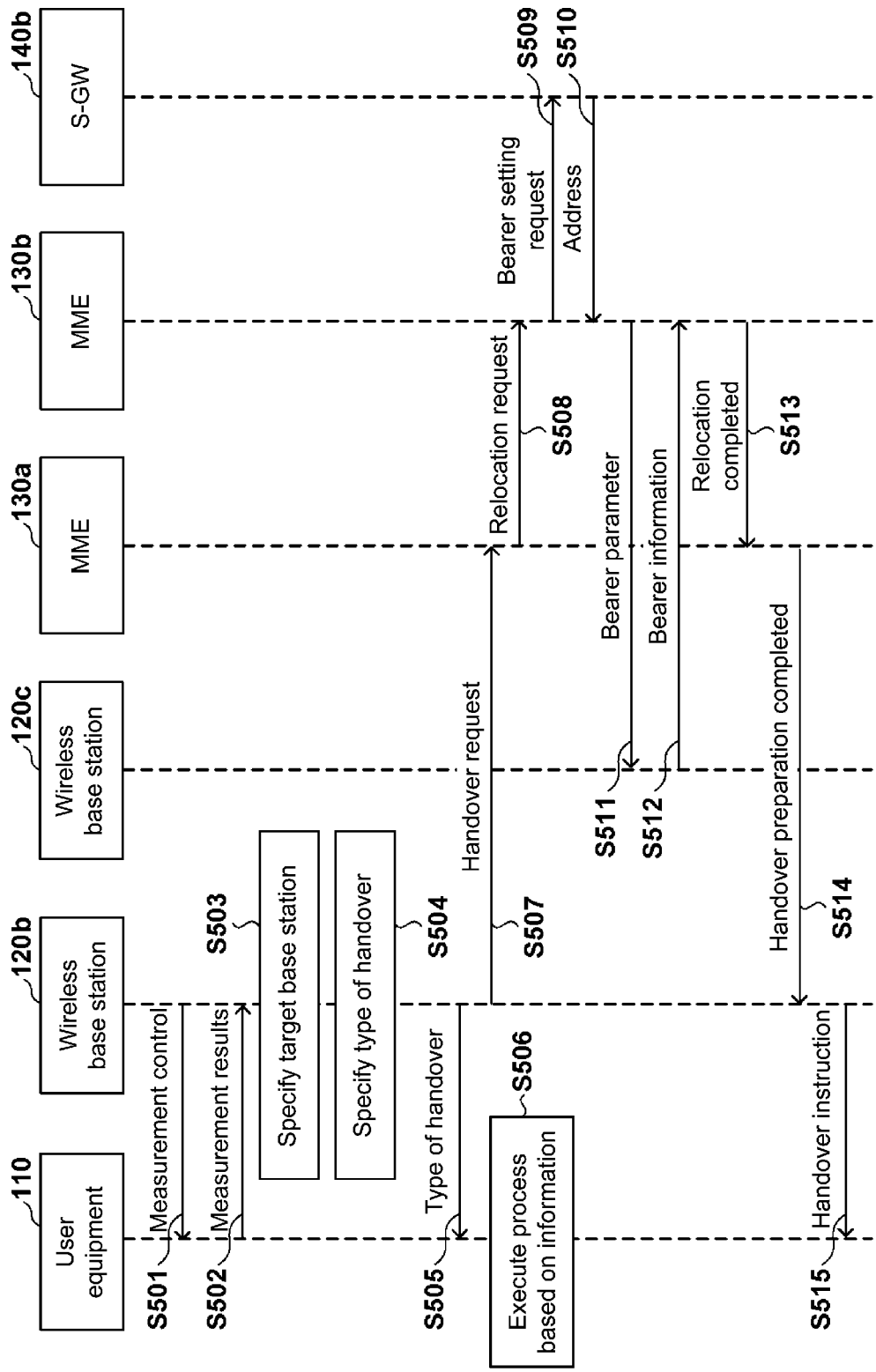
FIG. 5 is a sequence diagram describing an exemplary operation of a communication system in accordance with one aspect of the present disclosure.

Automation of the communication system when handover is performed in contrast to current communications by the user terminal 110 will be described while referring to FIG. 4 and FIG. 5. Each step of the method described in FIG. 4 and FIG. 5 is performed, for example, by the processors of the devices (user terminal 110, wireless base station 120, and the like) executing a program stored in the memory. Alternatively, some or all steps of the method may be implemented in hardware such as an ASIC (Application-Specific Integrated Circuit). At the start of an operation in FIG. 4 and FIG. 5, the user terminal 110 shall be in a condition communicating with the communication system via the wireless base station 120. In the following description, unless otherwise specified, a signal function may be the same as that in a conventional handover process, and therefore, a detailed description is omitted.

FIG. 4 illustrates a case where the user terminal 110 moves within a coverage of the wireless base station 120a, and handover is performed from the wireless base station 120b to the wireless base station 120a.

In step S401, the wireless base station 120b transmits, for example, an RRC MEASUREMENT CONTROL message to the user terminal 110 to request the user terminal 110 to start measurement and reporting. In step S402, the user terminal 110 measures the quality of radio waves from the wireless base stations around the user terminal 110, and transmits the measurement results to the wireless base station 120b by, for example, an RRC MEASUREMENT REPORT message.

In step S403, the wireless base station 120b determines that handover may be performed from the wireless base station 120b to the wireless base station 120a based on the received measurement results. In the handover, a source wireless base station is the wireless base station 120b, and a target wireless base station is the wireless base station 120a. In this manner, the wireless base station 120b specifies its own station (wireless base station 120b) as a source wireless base station, and specifies the wireless base station 120a other than its own station as a target wireless base station. In step S404, the wireless base station 120b specifies a handover type. For example, the wireless base station 120b specifies the handover type by specifying a type of interface used to request handover. Specifically, the wireless base station 120b specifies that an X2 interface is established between the wireless base station 120a and wireless base station 120b, and specifies that a handover request is transmitted to the wireless base station 120a via the X2 interface. The handover may be referred to as a handover between wireless base stations or an X2 handover.

In step S405, the wireless base station 120b notifies the user terminal 110 of information related to the specified handover type. For example, the information related to the handover type may contain information related to the type of interface used to request the handover. Additionally or alternatively, the information related to the handover type may contain information related to whether or not the handover is a soft handover or a hard handover. The information related to the interface type may be the interface type itself or may be information determined based on the interface type. Specifically, the wireless base station 120b may notify the user terminal 110 that the handover request is performed via the X2 interface. Alternatively or additionally, the wireless base station 120b may provide notification of information related to the interface type, such as an estimated value of time required for the handover process based on the interface type, a delay estimated value associated therewith, and the like. The estimated value of time required for the handover process based on the interface type or delay estimated value associated therewith may be managed in a table for each handover type. The notification is transmitted, for example, as a message in RRC. In step S406, the user terminal 110 may perform a predetermined operation based on the received notification. A specific example of the predetermined operation is described later.

In step S407, the wireless base station 120b transmits a handover request to the wireless base station 120a via the X2 interface. The request includes, for example, information related to an E-RAB (E-UTRAN Radio Access Bearer) to be set by the wireless base station 120a. In step S408, the wireless base station 120a transmits a confirmation response to the wireless base station 120b via the X2 interface.

In step S409, the wireless base station 120b transmits a handover instruction to the user terminal 110. Upon receiving the instruction, the user terminal 110 starts to execute handover. An operation hereinafter may be the same as an existing operation, and therefore, a description is omitted.

FIG. 5 illustrates a case where the user terminal 110 moves within a coverage of the wireless base station 120c, and handover is performed from the wireless base station 120b to the wireless base station 120c.

Operations in step S501 and S502 are similar to the operations in step S401 and S402. In step S503, the wireless base station 120b determines that handover is performed from the wireless base station 120b to the wireless base station 120c based on the received measurement results. In the handover, a source wireless base station is the wireless base station 120b, and a target wireless base station is the wireless base station 120c. In this manner, the wireless base station 120b specifies its own station (wireless base station 120*b*) as a source wireless base station, and specifies the wireless base station 120*c* other than its own station as a target wireless base station. In step S504, the wireless base station 120*b* specifies a handover type. Specifically, the wireless base station 120*b* specifies that an X2 interface is not established between the wireless base station 120*b* and wireless base station 120*c*, and determines that a handover request is transmitted to the wireless base station 120*c* via an S1 interface. The handover may be referred to as a handover between MMEs or an S1 handover.

In step S505, the wireless base station 120*b* notifies the user terminal 110 of information related to the specified handover type. Specifically, the wireless base station 120*b* notifies the user terminal 110 that the handover will be performed via the S1 interface. The notification is transmitted, for example, as a message in RRC. Similar to step S405, notification of other information related to the handover type may be provided. In step S506, the user terminal 110 may perform a predetermined operation based on the notification received. A specific example of the predetermined operation is described later.

In step S507, the wireless base station 120*b* transmits to the MME 130*a* to which the wireless base station 120*b* is connected a handover request to the wireless base station 120*c*. In step S508, the MME 130*a* transmits an MME relocation request to the MME 130*b* serving as a change destination.

In step S509, the MME 130*b* transmits a bearer setting request to the S-GW 140*b* serving as a change destination. In response thereto, in step S510, the S-GW 140*b* transmits an S-GW address of a bearer of which to notify the wireless base station 120*c* to the MME 130*b*.

In step S511, the MME 130*b* transmits a parameter of an E-RAB to be set to the wireless base station 120*c*. In step S512, the wireless base station 120*c* transmits the set E-RAB information to the MME 130*b*.

In step S513, the MME 130*b* notifies the MME 130*a* that relocation is completed. In step S514, the MME 130*a* notifies the wireless base station 120*b* that handover preparation is complete. In step S515, the wireless base station 120*b* transmits a handover instruction to the user terminal 110. Upon receiving the instruction, the user terminal 110 starts to execute handover. An operation hereinafter may be the same as an existing operation, and therefore, a description is omitted.

Figure 6:
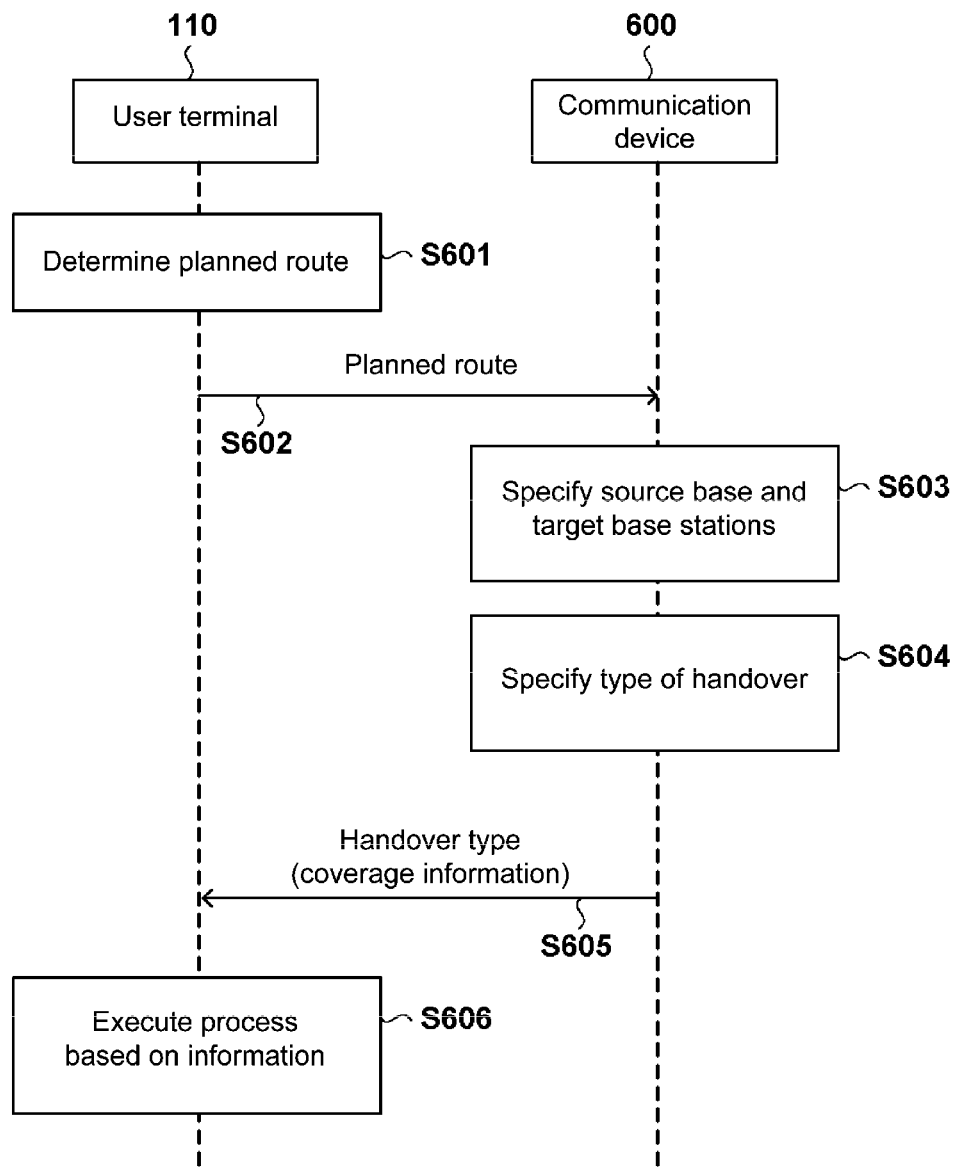
FIG. 6 is a sequence diagram describing an exemplary operation of a communication system in accordance with one aspect of the present disclosure.

An operation of the communication system when handover is performed with regard to travel destination communications by the user terminal 110 will be described while referring to FIG. 6. The operation is executed in cooperation by the user terminal 110 and a communication device 600. The communication device 600 may be a wireless base station 120*b* in a condition communicating with the user terminal 110, a wireless base station (wireless base station 120*a* or the like) in a condition not communicating with the user terminal 110, a communication device with a core network (for example, MME 130*a*, 130*b*), or another communication device connected to a core network by the Internet or the like. If the communication device 600 is a communication device other than the wireless base station 120*b* in a condition communicating with the user terminal 110, communication between the user terminal 110 and communication device 600 may be performed via a path that passes through the wireless base station 120*b* or another path. A configuration example of the communication device 600 may be similar to the configuration example of the wireless base station 120 described in FIG. 3, and therefore, a description is omitted. Each step of the method described in FIG. 6 is performed, for example, by the processors of the devices (user terminal 110 and communication device 600) executing a program stored in the memory. Alternatively, some or all steps of the method may be implemented in hardware such as an ASIC (Application-Specific Integrated Circuit).

In step S601, the user terminal 110 determines a planned travel route of the user terminal 110. For example, if the user terminal 110 is a vehicle, the user terminal 110 determines a route to a destination instructed from the driver. The determined route is referred to as planned route. In step S602, the user terminal 110 transmits the planned route to the communication device 600. The planned route is an example of information that may specify the source wireless base station and target wireless base station of the handover with regard to travel destination communication by the user terminal 110.

In step S603, the communication device 600 specifies wireless base stations having overlapping coverage on the planned route and an order in which the user terminal 110 passes through each coverage. Information related to the coverage of the wireless base stations provided by the communication system may be stored in the communication device 600 in advance or an inquiry may be made to the wireless base stations. Furthermore, the communication device 600 specifies two consecutive wireless base stations as a source wireless base station and target wireless base station. For example, the user terminal 110 currently within a covered region of the wireless base station 120*b* is scheduled to travel on a route that passes through a covered region of the wireless base station 120*c* and then passes through a covered region of the wireless base station 120*d*. In this manner, the communication device 600 specifies the wireless base station 120*c* other than the wireless base station 120*b* as a source wireless base station, and specifies the wireless base station 120*d* other than its own station as a target wireless base station.

In step S604, the communication device 600 specifies the type of handover used to request handover from a source wireless base station (for example, wireless base station 120*c*) to a target wireless base station (for example, wireless base station 120*d*). In this example, the communication device 600 specifies that an X2 interface is established between the wireless base station 120*c* and wireless base station 120*d* and that X2 handover is performed. The specification may be performed by the communication device 600 making an inquiry to the wireless base station 120*c* and/or wireless base station 120*d*.

In step S605, the communication device 600 notifies the user terminal 110 of information related to the handover type from the source wireless base station (for example, wireless base station 120*c*) to the target wireless base station (for example, wireless base station 120*d*). Along with the notification, the communication device 600 may notify the user terminal 110 of information related to at least one covered region of the source wireless base station (for example, wireless base station 120*c*) and target wireless base station (for example, wireless base station 120*d*). Information related to the covered region includes a geographical position of a wireless base station, a communicable distance, communication direction, and the like. Based on the information related to the handover type, the user terminal 110 may predict how much delay will occur due to the handover executed on the planned route. Furthermore, based on the information related to the handover type and information related to the covered region, the user terminal 110 may predict how much delay will occur due to the handover executed at what position on the planned route.

In steps S604 and S605, when a plurality of sets of source wireless base stations and target wireless base stations are present on the planned route, the communication device 600 may notify the user terminal 110 of the handover type (and, if necessary, information related to the covered region) for the sets.

In step S606, the user terminal 110 may perform a predetermined operation based on the notification received. A specific example of the predetermined operation is described later.

Figure 7:
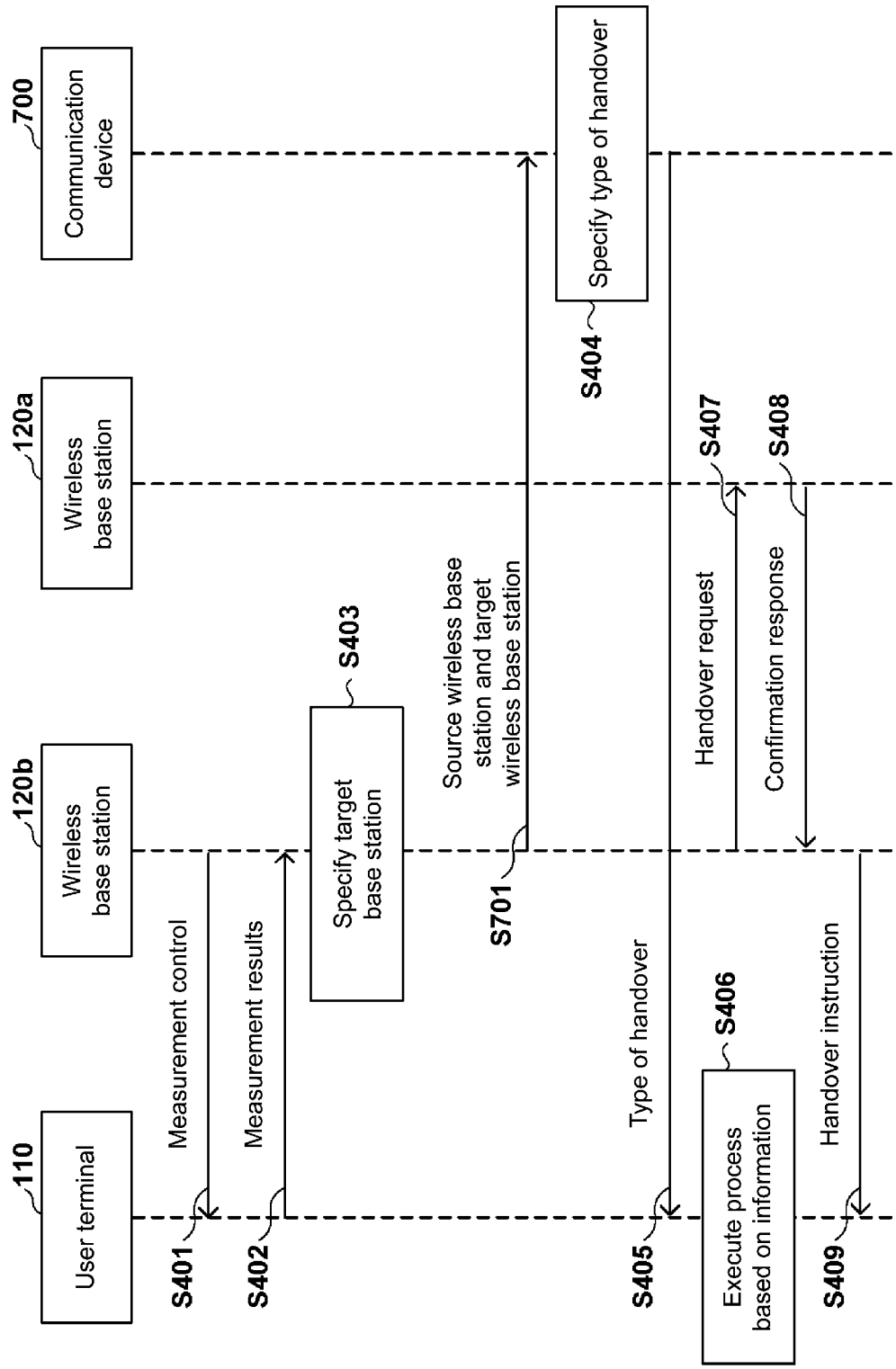
FIG. 7 is a sequence diagram describing an exemplary operation of a communication system in accordance with one aspect of the present disclosure.

A modification of the operation of the communication system in FIG. 4 will be described while referring to FIG. 7. In the example in FIG. 4, the wireless base station 120b in a condition communicating with the user terminal 110 executes step S404 and step S405. However, in FIG. 7, the communication device 700 other than the wireless base station 120b executes step S404 and step S405. The communication device 700 may be a wireless base station (wireless base station 120a or the like) in a condition not communicating with the user terminal 110, a communication device with a core network (for example, MME 130a, 130b), or another communication device connected to a core network by the Internet or the like. Communication between the user terminal 110 and communication device 700 may be performed on a route passing through the wireless base station 120b or another route. A configuration example of the communication device 700 may be similar to the configuration example of the wireless base station 120 described in FIG. 3, and therefore, a description is omitted. Each step of the method described in FIG. 7 is performed, for example, by the processors of the devices (user terminal 110 and communication device 700) executing a program stored in the memory. Alternatively, some or all steps of the method may be implemented in hardware such as an ASIC (Application-Specific Integrated Circuit).

The operations of steps S401 to S403 are the same as FIG. 4. In step S701, the wireless base station 120b transmits information specifying a source wireless base station (for example, wireless base station 120b) and target base station (for example, wireless base station 120a) of the specified handover to the communication device 700. In step S404, the communication device 700 specifies the handover type based on the information. In step S405, the communication device 700 notifies the user terminal 110 of the information related to the handover type. The operations of steps S406 to S409 are the same as FIG. 4.

An operation of the communication system in FIG. 5 may be modified as shown in FIG. 7. In other words, instead of the wireless base station 120b executing step S504 and step S505, the communication device 700 may execute these steps. In this case, the wireless base station 120b transmits information specifying a source wireless base station (for example, wireless base station 120b) and target base station (for example, wireless base station 120c) of the specified handover to the communication device 700 during step S503 and step S504.

Figure 8:
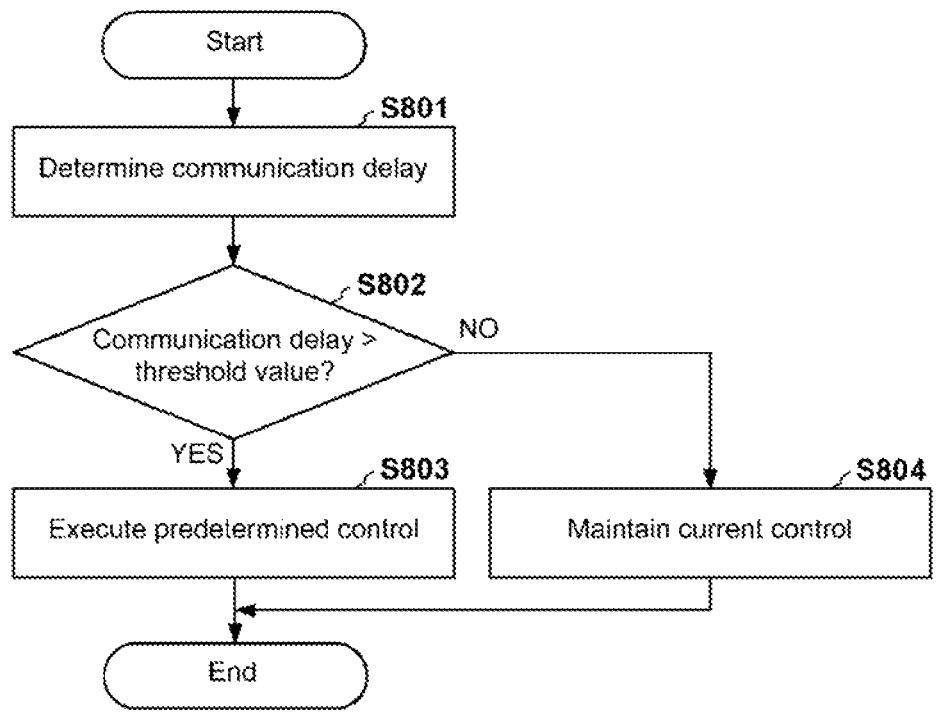
FIG. 8 is a flowchart describing an exemplary operation of a user terminal in accordance with one aspect of the present disclosure.

A specific example of a process executed in the aforementioned steps S406, S506, and S606 will be described while referring to FIG. 8. In step S801, the user terminal 110 determines a communication delay occurring in the user terminal 110 based on the notified information. For example, the user terminal 110 may determine a delay time by storing a delay time corresponding to the handover type in the memory 112 in advance and then reading the delay time based on the notified handover type from the memory 112. Alternatively, the user terminal 110 may receive a value of time required for handover as information related to the handover type from a communication device (for example, wireless base station) and then determine a delay time based on the time.

In step S802, the user terminal 110 determines whether or not the determined delay time is greater than a threshold value. If the condition is satisfied ("YES" in step S802), the user terminal 110 transitions the process to step S803, and if the condition is not satisfied ("NO" in step S802), the user terminal 110 transitions the process to step S804.

In step S803, the user terminal 110 executes a predetermined control to be performed when the delay time is greater than the threshold value. For example, when notification is provided that the handover is performed through an S1 interface, serving as a different interface from an X2 interface, the delay time when executing S1 handover is relatively long. Therefore, the user terminal 110 during travel (travel controlling part 117) may, for example, reduce the traveling speed or turn on a hazard light. Additionally or alternatively, the user terminal 110 during travel (travel controlling part 117) in remote driving or automatic driving may execute safe driving control (predetermined traveling condition control) such as canceling (limiting) remote driving or automatic driving, and the like. The threshold value in step S802 may be a value based on a predetermined control executed in step S803.

In step S804, the user terminal 110 maintains a current traveling condition control. The predetermined traveling condition control executed in step S803 may be at least one of (1) a traveling condition control of reducing a traveling speed of the vehicle, (2) a traveling condition control of reducing an operating authority of a remote driving operator, (3) a traveling condition control of reducing an automatic control function or item, and (4) a traveling condition control of increasing information content with regard to a traffic participant outside of the vehicle, rather than the traveling condition control maintained (executed) in step S804.

Figure 9:
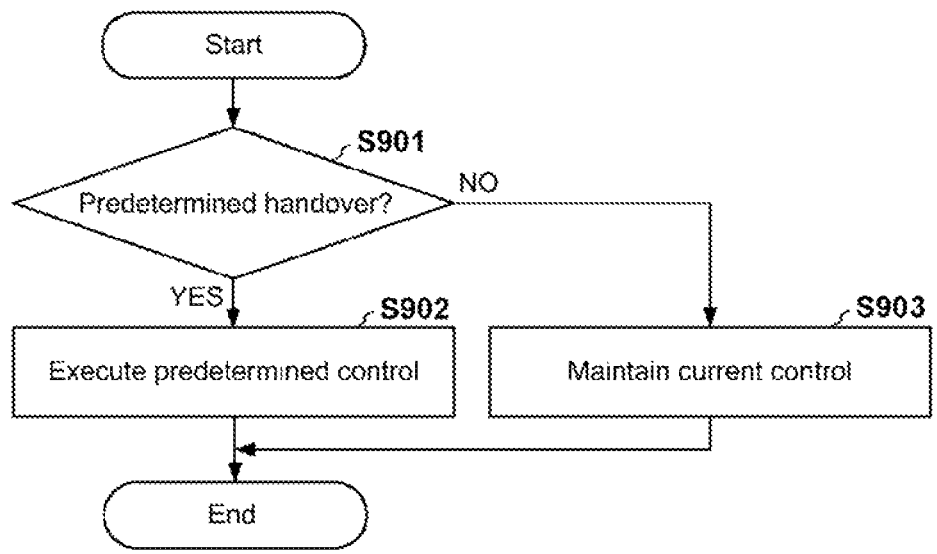
FIG. 9 is a flowchart describing an exemplary operation of a user terminal in accordance with one aspect of the present disclosure.

Another specific example of a process executed in the aforementioned steps S406, S506, and S606 will be described while referring to FIG. 9. In the example in FIG. 8, the user terminal 110 determines a communication delay occurring in the user terminal 110 based on the notified information. However, it is possible to grasp that a long communication may occur without determining a specific value of the communication delay, based on the type of notified handover. Therefore, in step S901, the user terminal 110 determines whether or not the information related to the notified handover type is information related to a predetermined handover type. The predetermined handover type is, for example, a type of handover where a communication delay occurring in the user terminal 110 is greater than the threshold value (for example, handover using the S1 interface).

If the condition in step S901 is satisfied ("YES" in step S901), the user terminal 110 transitions the process to step S902, and if the condition is not satisfied ("NO" in step S901), the user terminal 110 transitions the process to step S903. Steps S902 and S903 are the same as steps S803 and S804.

In the aforementioned embodiment, the X2 interface and S1 interface are exemplified as the handover type notified to the user terminal 110. However, the notified handover type is not limited to this. For example, when handover is performed to another communication system including an SGSN 160, a handover request is transmitted via an S3 message between the MME 130*a* and SGSN 160 (so-called S3 handover). In this case, the wireless base station 120*b*, communication device 600, or communication device 700 notifies the user terminal 110 that an S3 interface is used.

In the aforementioned embodiment, the handover wireless base station 120*b* (so-called source wireless base station) notifies the user terminal 110 of the type of handover used to request handover to the target wireless base station. Therefore, the user terminal 110 may predict a delay time for handover, and thus the user terminal may perform a process based on the delay time. Furthermore, notification (S405, S505) of the handover type is performed prior to the handover instruction (S409, S515). Therefore, the user terminal 110 may predict a delay time for handover at an early stage.

In an embodiment, a communication device (120*b*, 600, 700) is provided, including: a memory storing instructions when executed by a processor causes the processor to: specify a type of handover executed by a user terminal (110); and notify the user terminal of information related to the specified handover type.

According to this embodiment, the user terminal may predict a delay time required for handover, and thus the user terminal may perform a process based on the delay time.

Optionally, where: the communication device is a wireless base station (120*b*); and specifying the type of handover comprises using the communication device as a source wireless base station.

According to this embodiment, the user terminal may predict a delay time required for handover of a current communication.

Optionally, wherein the memory storing instructions when executed by the processor causes the processor to transmit a handover instruction to the user terminal, and wherein notifying the user terminal comprises providing the information related to the type of the handover prior to transmitting the handover instruction to the user terminal (S409, S515).

According to this embodiment, the user terminal may predict a delay time required for handover at an early stage.

Optionally, where: the communication device is a source wireless base station (120*b*); and specifying the type of handover comprises using a second wireless base station (120*c*) other than the communication device as a target wireless base station of the handover.

According to this embodiment, the user terminal may predict a delay time required for handover of travel destination communication.

Optionally, wherein notifying the user terminal comprises information related to coverage of at least one of the source wireless base station and the target wireless base station of the handover (S605).

According to this embodiment, the user terminal may know the position where handover is performed at the travel destination.

Optionally, where specifying the type of the handover is based on a type of an interface used to request handover.

According to this embodiment, a type of handover may be specified based on a type of interface.

Optionally, where the interface type includes at least one of an interface between a source wireless base station and a target wireless base station of the handover and an interface between the source wireless base station and a core network (130*a*).

According to this embodiment, the user terminal may know about handover between wireless base stations and handover including a core network.

In an embodiment, a program is provided for causing a computer to function as the communication device according to any one of configurations.

According to this embodiment, the aforementioned configuration may be provided in a program form.

In an embodiment, a user terminal (11) is provided. The user terminal includes a memory storing instructions when executed by a processor causes the processor to receive (111, S405, S505, S605) information related to a handover type from a communication device (120*b*, 600, 700).

According to this embodiment, the user terminal may predict a delay time required for handover, and thus the user terminal may perform a process based on the delay time.

Optionally, the memory storing instructions when executed by the processor causes the processor to notify (111, S601) the communication device of information for specifying a source wireless base station and a target wireless base station of the handover.

According to this configuration, a delay time required for handover of travel destination communication may be predicted.

Optionally, where the information includes a planned travel route of the user terminal.

According to this embodiment, a delay time required for handover occurring on a planned travel route may be predicted.

Optionally, the memory storing instructions when executed by the processor causes the processor to execute a control instruction (111, S801 to S803) based on the information related to the handover type.

According to this embodiment, the user terminal may predict a delay time required for handover, and thus the user terminal may perform a process based on the delay time.

Optionally, the user terminal is a vehicle (110); and the control instruction determines, based on the information related to the handover type, whether or not a communication delay occurring in the user terminal is greater than a threshold value (111, S802), and executes a predetermined traveling condition control if the communication delay is greater than the threshold value (111, S803).

According to this embodiment, a vehicle serving as the user terminal may execute control based on a delay time required for handover.

Optionally, where: the user terminal is a vehicle (110); and the control instruction determines if the information related to the type of the handover corresponds to a type of predetermined handover (111, S901), and executes a predetermined traveling condition control if the information related to the handover type corresponds to the predetermined handover type (111, S902).

According to this embodiment, a vehicle serving as the user terminal may execute control based on the handover type.

Optionally, where the predetermined handover type is a type of handover where a communication delay occurring in the user terminal is greater than a threshold value.

According to this embodiment, a vehicle serving as the user terminal may execute control based on the type of handover with a large communication delay during handover.

Optionally, where the predetermined traveling condition control is a traveling condition control where a traveling speed of the vehicle is reduced as compared to a traveling condition control (S804, S903) executed when the communication delay is deemed to be greater than the threshold value or when the information related to the handover type is deemed to not be information related to the predetermined handover type.

According to this embodiment, a vehicle serving as the user terminal may decelerate based on the communication delay or handover type.

In an embodiment, a program is provided for causing a computer of the user terminal to perform the methods or functions according to any one of the embodiments alone or in combination.

According to this embodiment, the aforementioned configuration may be provided in a program form.

In an embodiment, a communication system is provided comprising: a communication device (120b, 600, 700), and a user terminal (110). The communication device includes a memory storing instructions when executed by a processor causes the processor to: specify a type of handover to be executed by the user terminal; and notify the user terminal of information related to the specified handover type. The user terminal includes a memory storing instructions when executed by a processor causes the processor to receive information related to the specified handover type from the communication device.

According to this embodiment, the user terminal may predict a delay time required for handover, and thus the user terminal may perform a process based on the delay time.

The present disclosure is not limited to the aforementioned embodiments, and various changes and modifications may be made without departing from the spirit and scope of the present disclosure. Therefore, the following claims are attached to publish the scope of the present disclosure.

The invention claimed is:

1. A communication device, comprising:
a memory storing instructions when executed by a processor causes the processor to:
specify a type of handover to be executed by a user terminal; and
notify the user terminal of information related to the specified handover type, and wherein:
the communication device is a wireless base station;
specifying the type of handover comprises using the communication device as a source wireless base station, and using a second wireless base station other than the communication device as a target wireless base station of the handover; and
the memory storing instructions when executed by the processor causes the processor to transmit a handover instruction to the user terminal, wherein notifying the user terminal comprises providing the information related to the specified handover type and an estimated value of time required for the handover process based on the interface type prior to transmitting the handover instruction to the user terminal.

2. The communication device according to claim 1, wherein notifying the user terminal comprises information related to coverage of at least one of the source wireless base station and the target wireless base station.

3. The communication device according claim 1, wherein specifying the type of handover is based on a type of an interface used to request the handover.

4. The communication device according to claim 3, wherein the interface type comprises at least one of an interface between the source wireless base station and a target wireless base station of the handover, and an interface between the source wireless base station and a core network.

5. A user terminal, comprising:
a memory storing instructions when executed by a processor causes the processor to receive information related to a handover type from a communication device and execute a control instruction based on the information related to the handover type, and wherein:
the user terminal is a vehicle; and
the control instruction determines, based on the information related to the handover type, if a communication delay occurring in the user terminal is greater than a threshold value, and executes a predetermined traveling condition control if the communication delay is greater than the threshold value.

6. The user terminal according to claim 5, wherein the memory storing instructions when executed by the processor causes the processor to notify the communication device of information for specifying a source wireless base station and a target wireless base station of the handover.

7. The user terminal according to claim 6, wherein the information comprises a planned travel route of the user terminal.

8. A user terminal, comprising:
a memory storing instructions when executed by a processor causes the processor to receive information related to a handover type from a communication device and execute a control instruction based on the information related to the handover type, and wherein:
the user terminal is a vehicle; and
the control instruction determines if the information related to the handover type corresponds to a predetermined handover type, and executes a predetermined traveling condition control if the information related to the handover type corresponds to the predetermined handover type.

9. The user terminal according to claim 8, wherein the predetermined handover type is a handover type wherein a communication delay occurring in the user terminal is greater than a threshold value.

10. The user terminal according claim 5, wherein the predetermined traveling condition control is a traveling condition control wherein a traveling speed of the vehicle is reduced if the communication delay is determined to be greater than the threshold value.

11. A communication system, comprising:
a communication device comprising a wireless base station; and
a user terminal; wherein:
the communication device comprises a memory storing instructions when executed by a processor causes the processor to:
specify a handover type to be executed by the user terminal, using the communication device as a source wireless base station; and
notify the user terminal of information related to the specified handover type, comprising providing the information related to the specified handover type and an estimated value of time required for the handover process based on the interface type prior to transmitting a handover instruction to the user terminal; and
the user terminal comprises a memory storing instructions when executed by a processor causes the processor to:
receive information related to the specified handover type from the communication device; and
transmit the handover instruction to the user terminal.

* * * * *